Sept. 5, 1967 J. E. YOUNG 3,340,401

MOTIONLESS DATA INPUT KEY

Filed Dec. 26, 1963

INVENTOR.
JAMES E. YOUNG

BY Anthony R. Cimmino
Daniel Rubin

ATTORNEY 3,340,401

MOTIONLESS DATA INPUT KEY

James E. Young, Pittsford, N.Y., assignor to Xerox Corporation, Rochester, N.Y., a corporation of New York Filed Dec. 26, 1963, Ser. No. 333,455
7 Claims. (Cl. 250—221)

This invention relates to a novel article of manufacture comprising a motionless data input key. More particularly, the invention relates to a novel form of non-mechanical key useful as a component of peripheral equipment to emit data input signals to logic or actuation circuits as input to a computer or the like.

With the advent of high-speed computers and other mechanical or electronic devices which produce data at high rates of speed, there has arisen a concommitant need for high-speed input data devices thereto for otherwise speed limitations in the input mechanism may act to retard the operation of the entire machine.

One of the more common forms of input mechanisms comprises a manually operable console type keyboard with each key when actuated intended to emit a particular electrical input signal representative of selective information. Currently, keys of the type employed utilize electromechanical transducers or linkages by which mechanical movement of the key in response to an operator's touch effects the signal input to the recipient equipment. Keys of this prior type have generally imposed certain limitations and, as a result, handicapped the system of which they are a part. Particularly, the mechanical features and movements of the prior art individual keys have imposed a speed limitation on the operator. At the same time, mechanical failures of the linkages due to environmental factors on wear, radio frequency interference generated by the typewriter affecting receivers in the area, to name a few, have handicapped reliability and sensitivity of the system of which they are a part. Accordingly, there has been a long-felt need to overcome these prior difficulties by providing highly sensitive key members susceptible to greater speed of operation with greater reliability able to emit signal input more compatible with the requirements of the recipient equipment.

Now in accordance with the instant invention, there is provided a novel improved small compact key member which may be utilized individually or adapted for assembly in a keyboard arrangement. They key is preferably motionless, as will be understood, and is possessed of high sensitivity for emitting electrical data input signals to externally located equipment.

It is therefore an object of the invention to provide a novel, motionless, highly sensitive key member for emitting data input signals to data processing apparatus.

It is a further object of the invention to provide a novel manually actuated key member adapted for keyboard assembly for emitting selective data input signals to data processing apparatus.

Figure 2:
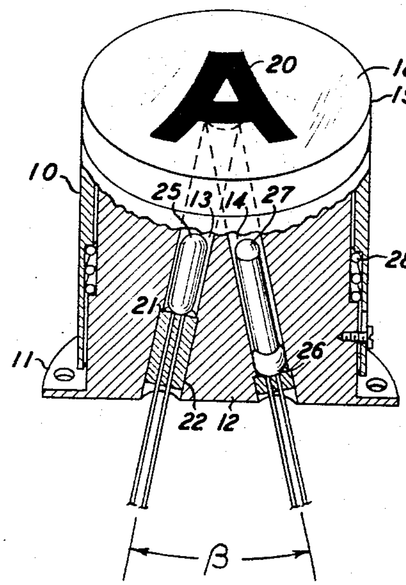
Figure 1:
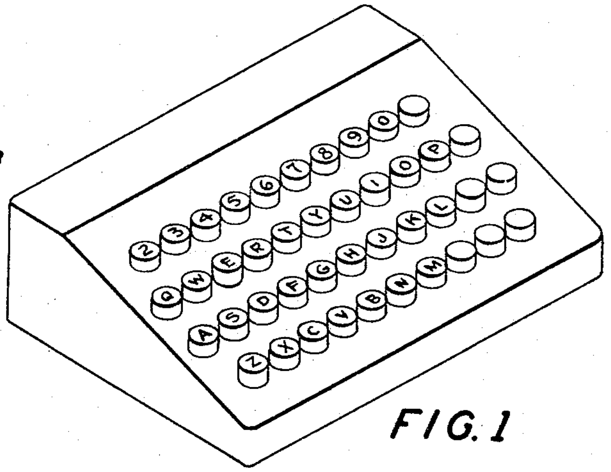
Figure 3:
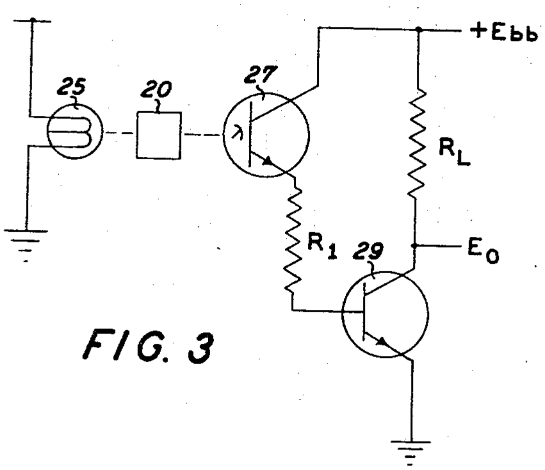
Figure 4:
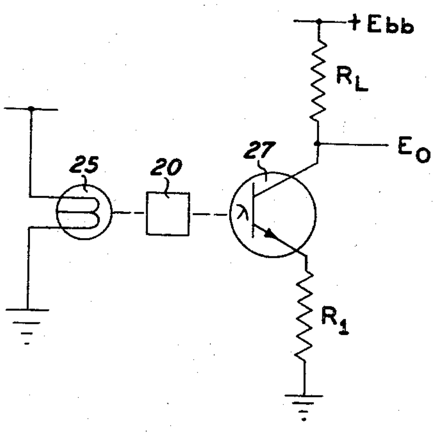

For a better understanding of the invention, as well as other objects and further features thereof, reference is had to the following detailed description of the invention to be read in conjunction with the accompanying drawings wherein:

FIG. 1 schematically illustrates the key member of the invention as assembled in a keyboard alignment;

FIG. 2 isometrically illustrates an individual key member, partially broken away to facilitate an understanding of its construction; and, FIGS. 3 and 4 are different electrical circuits as could be utilized herein.

Referring now specifically to FIGS. 1 and 2, the key member of the invention in a preferred embodiment comprises a tubular shell section 10 having an annular flange 11 about its lower portion for suitable mounting and filled internally or integrally comprising an opaque noncombustible material 12 of plastic or the like. Formed internally in material 12 are two vertically inclined bores 13 and 14, the axes of which are displaced at a critical angle B as will be explained below.

Supported overlying the apex at the intersection of the bores is a thin, concave, finger receptive cap 18 secured to the shell 10 by means of an annular ring 19. Cap 18 is preferably formed of a transparent or translucent material as to be normally light-transmitting and comprised of a thin section of conventionally marketed plastic such as an acrylic plastic prepared by molding and polishing techniques. Imprinted, engraved, or imbedded in cap 18 or secured between the top of fill 12 and the cap is a form of character 20, herein shown as the letter A, of opaque material in relative contrast to the light transmitting properties of the cap. Alternatively, the particular light transmitting properties of the cap and character could be reversed as will be understood. The character designation for each individual key is optional and will vary from key to key as in a typewriter (FIG. 1) with each character corresponding to a particular value of signal input known generally to the operator pretrained for operating the device. Balancing of the reflective light values for the different keys may or may not be required depending on the system in which they are a part.

Bore 13 includes a shoulder 21 against which is inserted a removable tapered plug 22 supporting a miniature bayonet type high output lamp 25, known generally in the industry as a "grain of wheat" type lamp operable from a 5.0 volt source. Such lamps are marketed commercially as General Electric "T-1" model 715 having 0.147 candle power and minimum life expectancy in excess of 40,000 hours. Where the entire key is disposable, the lamp can be cemented into place.

Bore 14 likewise has a shoulder 26 against which is mounted a photoelectric detection means 27 which may conveniently be a photo switching diode, silicone controlled rectifier, photo transistor, or the like as are commercially available and compatibly matched with the lamp 25. A Texas Instrument Corporation LS 400 cell in combination with the above mentioned lamp results in a key approximately ⅝" in diameter and about 1" long. For obvious reasons, the lower the light output the more sensitive the photocell required.

Many of the conventional photocells, including photovoltaic types, can be used herein. Conventional circuits normally used with the various photocells can likewise be used here. In the case of photoresistive cells, the responding circuitry should be sensitive to a change of current flow through a divider network or the voltage output resulting from the variation of current through a resistive load.

Other light sensors can be used with higher intensity light sources. Phototransistors, in which the output is proportional to the incident light can also be used. For the latter, the light acts as the base signal of a common emitter configuration transistor. The GE ZJ235 series light activated switch and the Solid State Products, Inc. Photran (photo SCR) 3PXXX series both perform in this device with light sources of adequate intensity. Either of these devices can switch rather heavy loads and are therefore more applicable to power switching applications than the typewriter or computer input keyboard application. At the same time, the higher output light sources produce much larger amounts of heat making their application to a compact key not limiting but less practical.

Basic circuits are shown in FIGS. 3 and 4. $R_1$ is a relay or resistive device. Typically, output voltage $E_0$ may be obtained and used directly from cell 27 as in FIG. 4 or amplified as a trigger from a switching transistor 29 or the like used to gate for example, a silicon controlled rectifier for power control or high current applications, or to control many other solid state or tube circuits.

Whereas an absence of mechanical linkage is preferred and is unnecessary to the operation hereof, mechanical systems such as spring bias of the entire cap section as by a helical spring 28 supporting the cap telescoped over the shell 10 can optionally be incorporated to effect the sensation of mechanical movement. Human engineering may require that the key provide the same touch or feel that is present in conventional keyboards. This spring allows the whole or part of the key body to move thereby giving an operator the same touch sensation presently experienced by a typist. It is not a necessary element for the function the key and thereby does not constitute a reliability hazard if it should fail.

In operation, a steady radiation is emitted from continuously energized lamp 25 directed as a collimated light beam upward through bore 13 illuminating character 20 and the larger component of the light is transmitted out through the cap structure. At the same time, a small component of the light is reflected from the character 20 presenting a light bias on the photocell. When manual contact as by the touch of an operator's finger is made with the upper surface of cap 18, the transmitted light is blocked and the reflected component substantially increased producing an appreciable change in the light incident on the photocell. The photocell responds to this light change producing an output signal indicating depression actuation or touch of the selected key to the appropriate logic or actuation circuits. Accordingly, it should be appreciated the angle $\beta$ (beta) between the axes of the bores 13 and 14 is critical to the extent that it is dependent upon the reflective and refractive properties of the particular material and surface characteristics comprising cap 18. Acrylic plastic when formed as desirable above has a refractive index of about 1.49 with less than 3% haze and 91–92 percent light transmission. The angle beta therefore for a ⅝ inch diameter key would be approximately 36 degrees.

To operate the device therefore in order to effect a discrete signal change from photoresponsive member 27, it is necessary only that the light reflective properties of cap 18 be discretely altered increasingly or decreasingly. This may be accomplished when desired to emit the particular signal impulse by contacting the top of the key by means of a finger or other similar opaque element. At the instant at which contacting occurs, the discrete change in light reflection to photochell 27 is immediately detected to emit a pulse representing the struck character to the appropriate logic circuitry or the like.

As a variation alternative to the above described key the key cap can be made or selected to vary absorption characteristics on finger contact with a cap material that is normally highly reflective. The acrylic can be suitably modified to render it more absorptive as by screening. With this construction the finger touching the key results in increased absorption thereby reducing the reflected radiation and varying the light incident on the photocell. This effects an increase in the photocell resistance (reduced conductance) thereby causing an increase in the voltage across the photocell and reduced IR drop across the load resistor.

As this operational principal is applicable to keys of many sizes from those used on a typewriter to those on a console the construction can be varied to suit the application. In the case of a typewriter key, which is approximately ⅝" in diameter, the light and photocell are restricted in size. This in turn restricts the light output and requires a more sensitive photocell to obtain usable output signals. In the confined volume of this type key, heat dissipation may be a problem and the life of the components in higher ambient temperatures should be considered in their selection.

By the above description, there has been disclosed a novel form of motionless key member operative as a photo-optical device without the attending motions and linkages associated with the mechanical devices of the prior art as to have high inherent reliability and significantly more sensitive response to a decision to effect signal input to data processing equipment. A simple action therefore of discretely altering the optical properties of any selective key cap effects a varied light attenuation and instantly produces a signal output. By this means, a keyboard can be operated in a manner of a typewriter at exceedingly high rates of speed limited only by the inherent physical limitations of the operator assigned to the task.

Since many changes could be made in the above construction and many apparently widely different embodiments of this invention could be made without departing from the scope thereof, it is intended that matter contained in the drawings and specification shall be interpreted as illustrative and not in a limiting sense.

What is claimed is:

1. An integral data input key comprising
(a) a cap having areas thereof of variably different light transmitting properties and secured to a supporting base;
(b) a light source;
(c) means forming a light enclosing duct internally extending through said base and communicating light from said source against said cap;
(d) means forming a second light enclosing duct internally extending through said base displaced from said first duct and disposed with said cap in reflecting light relation thereto to light communicated by said first duct; and,
(e) photoelectric means supported in said second duct and responsive to a discrete change in reflection density in the said second duct to emit an electrical signal output to utilization apparatus.

2. An integral data input key comprising
(a) a cap having areas thereof of variably different light transmitting properties;
(b) a body supporting said cap;
(c) a light source;
(d) means forming a light enclosing duct internally extending through said body to support said light source therewithin and communicate light from said source against said cap;
(e) means forming a second light enclosing duct internally extending through said body disposed with said cap in reflecting light relation thereto to light communicated by said first duct; and,
(f) photoelectric means supported in said second duct responsive to a discrete change in reflection density in the said second duct to emit an electrical signal output to utilization apparatus.

3. A key according to claim 2 in which the surface of said cap is responsive to finger touch to produce said discrete change in reflection density in said second duct.

4. A key according to claim 2 in which the body thereof is comprised of substantially opaque material.

5. A key according to claim 2 in which said cap is highly reflective and responds with reduced reflectivity to finger touch.

6. A key according to claim 2 in which said cap is substantially light transmitting and includes identifying opaque indicia representative of the electrical signal output thereof.

7. A keyboard including a plurality of individual keys according to claim 6 each having different distinguishable indicia thereon.

(References on following page)

References Cited

UNITED STATES PATENTS

| | | | |
|---|---|---|---|
| 2,228,780 | 1/1941 | Roberts. | |
| 2,310,482 | 2/1943 | Watson. | |
| 2,359,787 | 10/1944 | Peters | 250—221 X |
| 2,432,527 | 12/1947 | Lang | 197—98 X |
| 3,200,701 | 8/1965 | White | 88—14 |

RALPH G. NILSON, *Primary Examiner.*

J. D. WALL, *Assistant Examiner.*